United States Patent

Derry

[11] Patent Number: 5,919,086
[45] Date of Patent: Jul. 6, 1999

[54] COMBINE ROTOR AND METHOD

[75] Inventor: Kevin L. Derry, Chappell, Nebr.

[73] Assignee: Derry Farms, Inc., Chappell, Nebr.

[21] Appl. No.: 08/937,492

[22] Filed: Sep. 25, 1997

[51] Int. Cl.[6] .................................................. A01F 12/20
[52] U.S. Cl. ............................. 460/72; 460/80; 460/149
[58] Field of Search ................................ 460/72, 71, 70, 460/69, 77, 80, 109, 110, 113, 121, 122, 149

[56] References Cited

U.S. PATENT DOCUMENTS

| | | | |
|---|---|---|---|
| 3,927,679 | 12/1975 | Ausherman | 130/27 |
| 4,266,393 | 5/1981 | Taylor | 56/14.6 |
| 4,505,279 | 3/1985 | Campbell et al. | 130/27 |
| 4,889,517 | 12/1989 | Strong et al. | 460/66 |
| 4,946,419 | 8/1990 | Cromheecke et al. | 460/68 |
| 4,986,794 | 1/1991 | Ricketts | 460/67 |
| 5,035,675 | 7/1991 | Dunn et al. | 460/62 |
| 5,083,977 | 1/1992 | Coers | 460/71 |
| 5,125,871 | 6/1992 | Gorden | 460/69 |
| 5,145,462 | 9/1992 | Tanis et al. | 460/68 |
| 5,192,245 | 3/1993 | Francis et al. | 460/71 |
| 5,368,522 | 11/1994 | Ricketts et al. | 460/16 |
| 5,387,153 | 2/1995 | Tanis | 460/68 |
| 5,413,531 | 5/1995 | Tanis | 460/72 |
| 5,489,239 | 2/1996 | Matousek et al. | 460/62 |

FOREIGN PATENT DOCUMENTS 1938-082  2/1970  Germany .
598-587   3/1978  Russian Federation .

OTHER PUBLICATIONS

Case International Brochure, 2100 Axial–Flow Rotor, "The Rotor: A Revolution In Harvest Technology", 1994, pp. 14–15.
Case International Brochure, Drawings and Parts, "1688 Axial–Flow Combine Rotor", 1993, pp. 9B–11 and 9B–12.

Primary Examiner—Terry Lee Melius
Attorney, Agent, or Firm—Fields and Johnson, P.C.

[57] ABSTRACT

A combine rotor assembly and method of using the same are provided. The rotor assembly is characterized by a cylindrical drum having an outer peripheral surface. A plurality of helical or spiral shaped threshing groups are attached to the outer peripheral surface and extend substantially the length of the drum. Each of the curved threshing members making up a helical group are placed end to end resulting in a continuous and uninterrupted spiral or helical pattern. A plurality of straight threshing members are attached to the outer peripheral of the drum. The straight threshing members are interspersed between the helical or spiral groups in a plurality of longitudinally extending rows. The rows may be arranged in alternating fashion resulting in a staggered appearance.

16 Claims, 3 Drawing Sheets

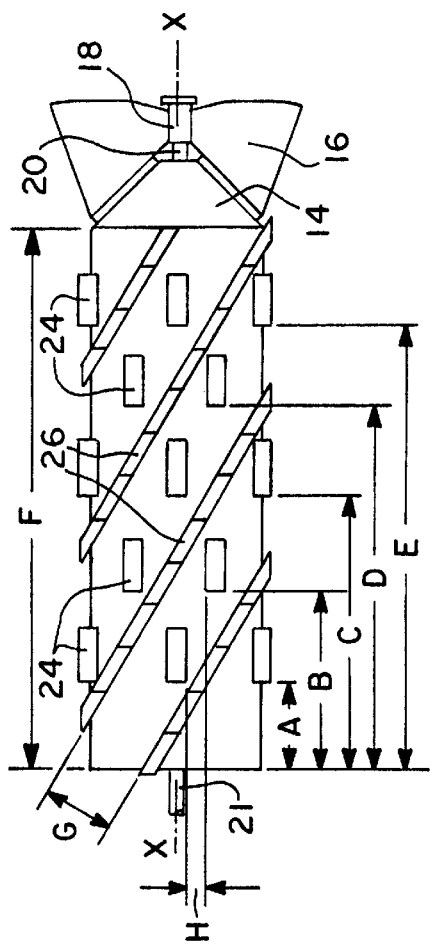
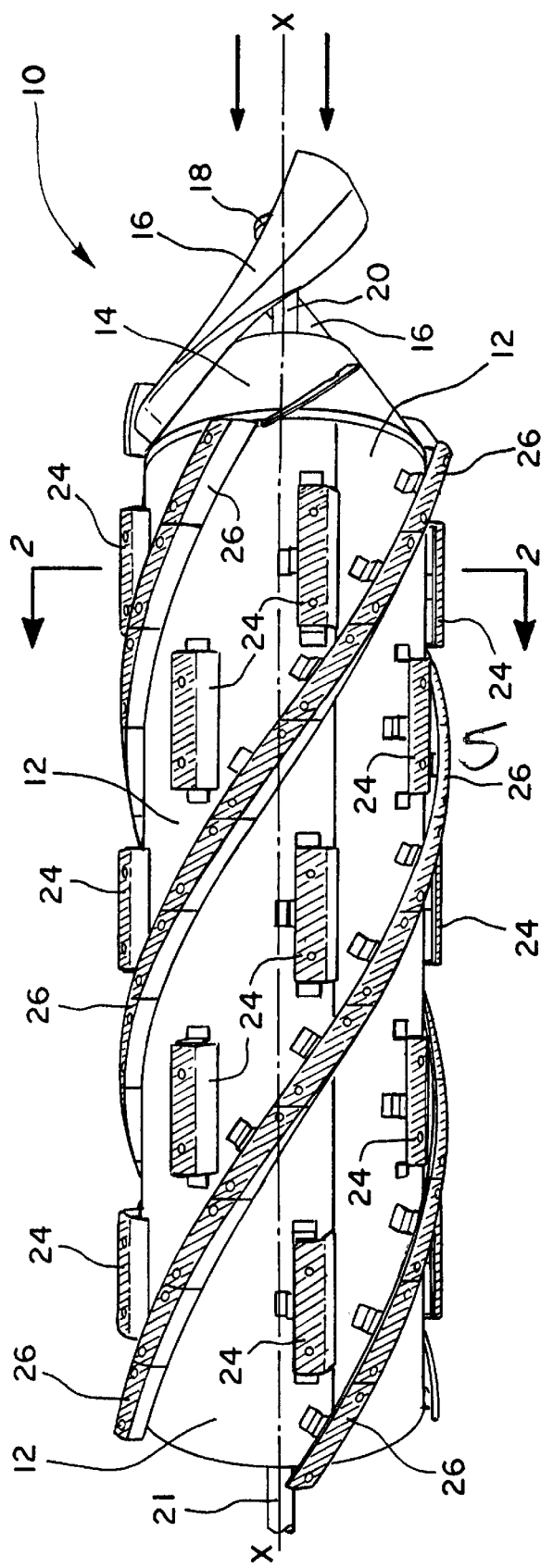

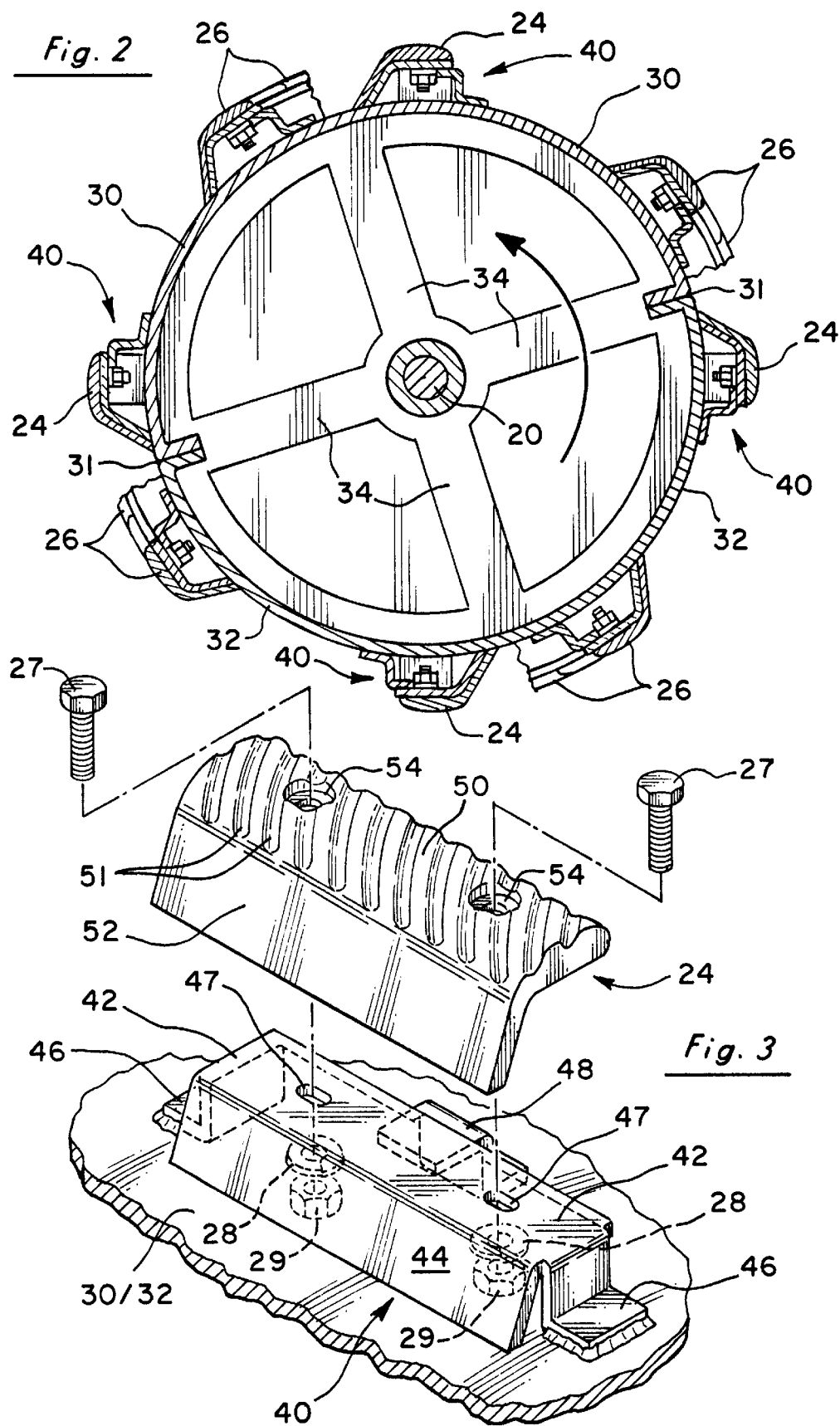

COMBINE ROTOR AND METHOD

TECHNICAL FIELD

The present invention relates to agricultural combines and, more particularly, to an axial rotor assembly for a combine including a specific arrangement of threshing elements mounted thereto.

BACKGROUND ART

Agricultural combines are the machinery used to harvest a number of different types of crops. A conventional combine includes a header assembly which cuts and collects the crop material as the combine is driven through the field. A feeder assembly communicates with the header assembly and advances the crop material to a rotor assembly on the combine. The rotor assembly threshes or otherwise separates the desirable crop material from the chaff or waste material.

A typical axial rotor assembly is characterized by a cylindrical shaped drum which is powered by a drive mechanism. The rotor assembly receives the crop material in an axial fashion, separates the desirable material and discharges the waste material at a discharge end of the rotor assembly. A plurality of threshing elements are attached to the outer periphery of the cylindrical drum. The rotor assembly may be driven at variable speeds depending upon the threshing element arrangement and the type of crop to be harvested. The threshing elements located on the outer periphery of the drum may have rasp or tooth-like configurations which make contact with the crop material as the rotor assembly is driven.

A casing or cage having specially adapted screen sizes surround the rotating drum allowing the desirable crop material to pass therethrough while the undesirable crop material is discharged at the discharge end of the rotor assembly.

A number of prior art references disclose various threshing element combinations, each combination tending to improve the threshing action by the rotor assembly with respect to one or more crop materials.

One well-known rotor assembly for harvesting many different types of crops is known as the "standard" rotor which includes a plurality of helical threshing elements which extend a portion of the length of the rotor assembly and which communicate with a plurality of straight bars or members. The helical threshing elements perform the threshing and the straight bars are used primarily to convey the crop material to a discharge end of the rotor. U.S. Pat. No. 5,145,462 is one example of a prior art reference which illustrates this standard rotor.

Other well-known combinations are known in the art as "specialty" rotors and are embodied in a number of other U.S. patents. A specialty rotor may be generally defined as one which includes an irregular pattern of threshing elements, each unique arrangement serving to better thresh a particular type of crop material or achieve some special advantage. A few specific examples of specialty threshing arrangements are found in U.S. Pat. Nos. 5,192,246; 4,889,517; 5,413,531; 5,035,675; 5,125,871; 5,192,245; and 5,413,531.

Another group of prior art references can be characterized by those which strictly illustrate a helical/spiral arrangement comprising a plurality of end to end threshing elements arranged in groups of spirals or helical patterns which extend along the length of the rotor. Examples of these prior art references include U.S. Pat. Nos. 4,266,393 and 4,505,279; German Patent No. DS-1938082; and Russian Patent No. 598-587.

Although each of the foregoing references may be adequate for their intended purposes, none disclose the unique threshing element pattern or arrangement herein.

DISCLOSURE OF THE INVENTION

In accordance with this invention, a rotor assembly is provided for use with an agricultural combine. The rotor assembly makes use of a special threshing element arrangement wherein the threshing process is maximized without sacrificing the quality of the crop material separated, or endangering the structure of the combine due to excessive power requirements or jamming of crop material between the cage and the rotor. In a broad disclosure of the invention, a cylindrical rotor is provided which receives the flow of crop material therealong in an axial direction. The front or lead edge of the drum includes a plurality of impellers which help to impart a rotational movement of crop material along the length of the rotor assembly. A plurality of helical threshing groups extend along substantially the length of the rotor. Each helical group comprises a number of individual curved threshing bars placed end to end and which form a continuous spiral which extends along the rotor. Each helical group or spiral is spaced circumferentially and maintains a uniform spiral shape along the rotor. A desired number and spacing of such curved threshing bars or members constitute the helical groups. Interspersed between the helical threshing groups are a plurality of straight threshing members or straight bars which extend along the longitudinal axis of the drum. The straight threshing members or straight bars are arranged in a plurality of rows, each row containing a desired number of straight bars spaced longitudinally from one another. Each of the rows extend parallel to the longitudinal axis of the drum and are spaced circumferentially with respect to one another around the drum. The straight bars in each row are separated from one another by the traversal of one helical threshing group or spiral.

In the preferred embodiment, the threshing elements are mounted over corresponding mounts which are welded to the outer peripheral surface of the drum. Each of the individual threshing elements have a general L shape and include contacting surfaces which may have grooves resembling a rasp type tool.

It has been found that the continuous helical pattern of threshing elements coupled with the straight threshing elements results in a threshing or separating action which is an improvement over the standard rotor and many specialty rotors.

Some of the advantages obtained by use of the threshing element pattern or arrangement of this invention include reduced damage to the harvested crop, yet increased harvesting speeds. Additionally, the increased harvesting speeds can be accomplished with less power being applied to the rotor assembly. In other words, increased speeds can be achieved without additional power output from the drive train which drives the rotor assembly. Additionally, the jamming of crop material as it is processed through the rotor assembly of this invention has been reduced in comparison to use of a standard rotor at similar speeds. Furthermore, side by side tests conducted with the rotor assembly of this invention and a standard rotor resulted in better separation by this invention of the desired crop material from the undesired material. Thus, the quality of the desired crop material harvested can be increased.

The continuous spiral arrangement of the threshing elements of this invention enables more positive control of the crop material as it traverses the length of the drum. In other words, the continual spiral pattern is advantageous in many applications because the crop material is transferred at uniform speeds along the length of the drum and is transferred in consistent patterns which reduces binding or jamming of crop material. In the standard rotor, a transition point occurs between the end of the helical members and the beginning of the straight members. As best understood by those skilled in the art, this transition point often becomes jammed or clogged because the crop material is forced to move in a different direction and at a different axial speed with regard to the length of the rotor.

The placement of the plurality of straight bars between the spiral groups increases the surface area in which threshing can occur as crop material passes along the drum. Additionally, because the helical groups and straight members extend throughout substantially the length of the drum, the threshing action occurs over a greater distance which ensures a high quality separation.

These and other advantages will become apparent when the drawings are considered in conjunction with the accompanying description.

BRIEF DESCRIPTION OF THE DRAWINGS

FIG. 1a is an enlarged pictorial side view of the rotor assembly of this invention;

FIG. 1b is a schematic view of the rotor assembly of this invention illustrating the specific spatial arrangement of the threshing elements;

FIG. 2 is an enlarged vertical section, taken along line 2—2 of FIG. 1a, illustrating the threshing elements in cross section;

FIG. 3 is greatly enlarged fragmentary partially exploded perspective view of a straight threshing element or bar and its corresponding mount;

BEST MODE FOR CARRYING OUT THE INVENTION

Figure 4:
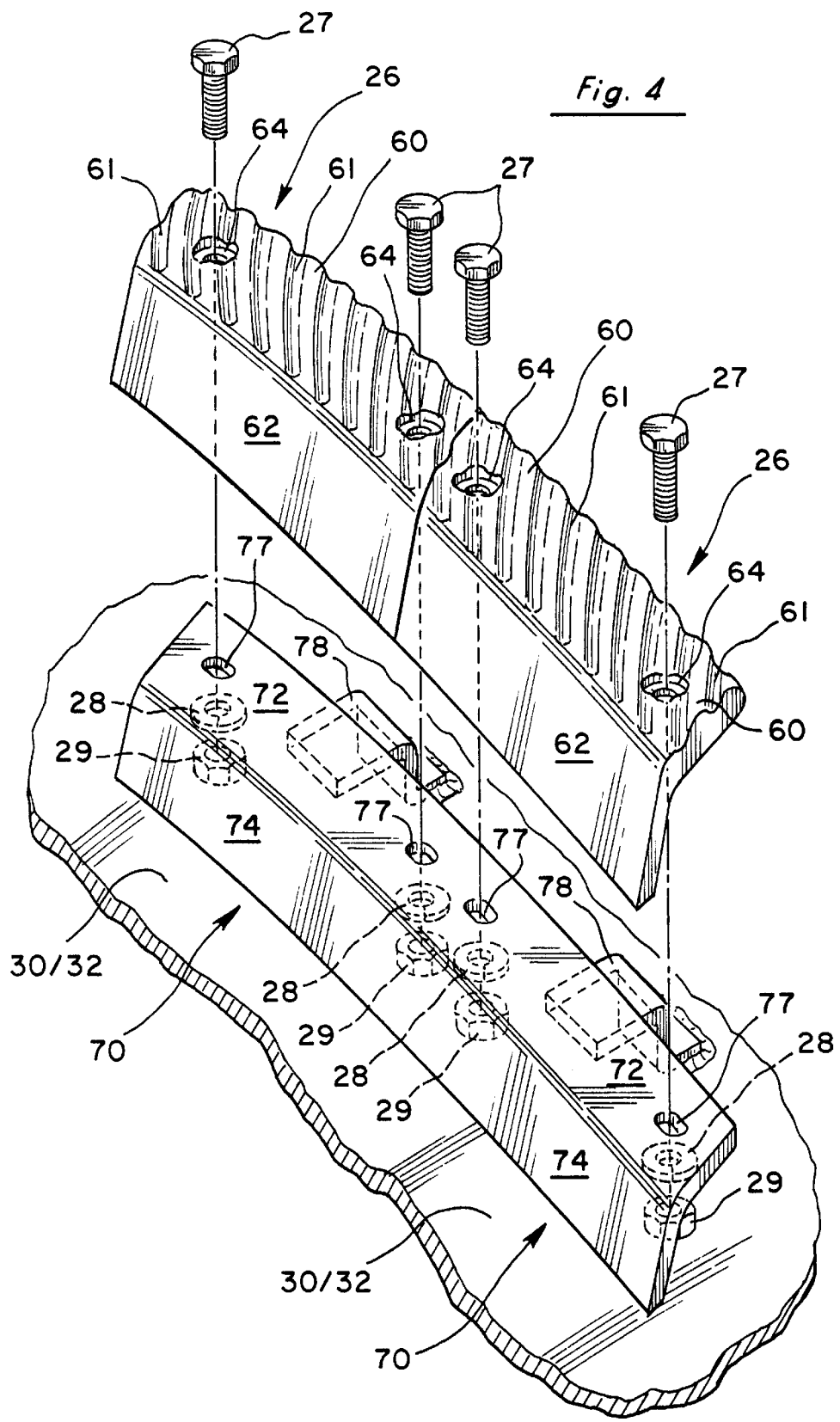
FIG. 4 is a greatly enlarged fragmentary partially exploded perspective view of a pair of curved threshing members or bars mounted on a corresponding mount.

FIG. 1a illustrates the improved combine rotor assembly of this invention. The rotor assembly 10 includes a cylindrical shaped drum 12 which extends along longitudinal axis x—x. The crop material is fed along the drum 12 from right to left and between a cage or casing (not shown) which concentrically surrounds the exterior of the rotor assembly 10. The leading or front side of the drum 12 includes a conical section 14. The trailing or discharge end of the drum 12 is a substantially flat surface perpendicular to axis x—x. A plurality of impellers 16 may be mounted to shaft 20 by impeller mounts 18. Shaft 20 traverses through the interior of drum 12 and communicates adjacent the discharge end of the drum to a drive mechanism such as a motor (not shown). A drive shaft 21 connects to the drive mechanism at one end, and connects to the drum 12 on the other end. The rotor assembly 10 is journaled on bearings (not shown) at each end of the shaft in order to stabilize it within the casing. A peripheral or exterior surface of the drum 12 has mounted thereto a plurality of threshing members. The first set of threshing elements are a plurality of curved bars 26 which when placed end to end result in a helical or spiral configuration or group which extends substantially the length of the drum. Each of the helical or spiral configurations maintain a substantially parallel relationship with one another as they traverse the length of the drum. In the preferred embodiment, there are four groups of helical configurations or spirals which traverse the length of the drum. Each of the spiral or helical configurations, as best seen in FIG. 2, are spaced uniformly and circumferentially from one another.

The other set of threshing elements are the plurality of straight members or bars 24. Bars 24 are interspersed between the helical or spiral groups, each straight bar 24 being axially aligned with one or more bars 24 which define a longitudinally extending row. In the preferred embodiment, there are four rows of straight bars having three bars in each row, and four additional rows of straight bars having two bars in each of the additional four rows. Each 4×3 row is separated by a 4×2 row. The alternating 4×3 and 4×2 rows of straight bars are also staggered with respect to one another. That is, adjacent rows of straight bars are shifted longitudinally with respect to one another so that a line drawn perpendicular to axis x—x will touch only one bar of one row.

FIG. 1b illustrates the preferred arrangement of the threshing bars 24 and 26. The distance from the discharge end of the drum to the discharge end of the leftmost straight bar 24 in a 4×3 row is approximately 8" and is represented by distance A. The distance from the discharge end of the drum to the discharge end of the leftmost straight bar 24 in a 4×2 row is approximately 25" and is represented by distance B. Similarly, distances C, D and E correspond to approximately 41", 57" and 71" for those distances between the remaining straight bars found in the 4×2 and 4×3 rows. The overall length F of a standard drum manufactured by Case International of Racine, Wis., is approximately 88" which does not include the length of conical section 14. The distance between adjacent spiral groupings of curved bars 26 is approximately 20" and is represented by distance G. The circumferential spacing between adjacent edges of straight bars in adjacent rows is approximately 10" and is represented by distance H. The plurality of end to end curved bars 26 spiral or rotate around the drum 12 with respect to longitudinal axis x—x. Also, in the preferred embodiment, the length of each of the straight bars 24 is approximately 11" while the length of each of the helical bars 26 is 8".

Although specific dimensions have been provided herein to describe the arrangement of bars 24 and 26 with respect to a preferred embodiment, it will understood by those skilled in the art that the specific spacing between the bars and the angle of rotation of the spiral groups can be altered and yet fall within the scope of the claimed invention. For example, it may be desirable to provide more than 8 longitudinal rows of straight bars in order to increase the surface area by which threshing takes place. Alternatively, it is also contemplated that a desired number of straight bars can be removed to reduce the threshing area and allow the crop material to more easily pass along the drum. Similarly, the number of spiral groups can be increased or decreased to best accommodate the specific type of crop material encountered. Furthermore, greater angled spiral or helical configuration is contemplated which will result in the slower traversal of crop material along the length of the rotor while a lesser angled spiral or helical configuration will result in the crop material to more quickly pass along the drum. Furthermore, the widths and lengths of each of the helical and straight bars can be increased or decreased to optimize the desired threshing action.

FIG. 2 illustrates the longitudinal section taken along line 2—2 which further shows the circumferential spacing of the straight and curved bars with respect to themselves and one another. As shown, the drum 12 may be configured in two half section 30 and 32 which are joined together along seam 31. The interior of the drum may be supported by a plurality of support trusses 34 or other well-known supporting structures. The shaft 20 is inserted through an opening formed in the interior of drum 12, the shaft protruding from the leading end of the drum. FIG. 2 shows each of the visible straight bars 24 in cross section. The visible curved bars 26 are also shown in cross section with the spiral group extending therefrom being cut away for illustration purposes only.

The attachment of straight bars 24 to the drum 12 will now be described with respect to FIG. 3. As shown, a straight bar mount 40 connects directly to the drum 12. Each straight bar mount may include a contact surface 42 joined to a side surface 44. The mount 40 may further include a pair of end plates 46 which are configured in an L shape and which are attached to the drum 12 as by welding. Additionally, mount 40 may include an additional side plate 48 welded to the drum to further provide structural support for the mount 40. As shown, the most peripheral surface of the side plate 48 attaches to the underside of contact surface 42. A plurality of openings 47 may be formed in contacting surface 42. Straight bar 24, when mounted in the position of FIG. 3, resembles an inverted L shaped member having a grooved contacting surface 50 and a side surface 52. Grooved surface 50 has a plurality of grooves or rasps 51. A pair of openings 54 are drilled through surface 50. A pair of bolts 27 are inserted through aligned openings 54 and 47. Straight bar 24 is securely mounted to its corresponding mount 40 by attaching washers 28 and nuts 29 to corresponding bolts 27.

FIG. 4 illustrates a means by which the curved threshing members 26 may be attached to the drum 12. As shown, curved bar mount 70 has a generally curved shape and includes a contacting surface 72 and a side surface 74. One or more side plates 78 can be used to secure the mount 70 to the drum 12. One end of the side plate 78 may be welded to the drum 12 and the other end of the side plate attached to the underside of contacting surface 72.

Curved threshing members 26 are structurally similar to straight bars 24 with the exception that the bars 26 have a curved shape and result in the spiral or helical pattern when placed end to end. Each curved bar 26 includes a contact surface 60 having a plurality of grooves 61 formed thereon. A side surface 62 extends perpendicularly from surface 60. A pair of openings 64 may be formed through surface 60 while a matching group of openings 77 may be formed through surface 72 of mount 70. As with the straight bars 24, bolts 27 with corresponding washers 28 and nuts 29 can be used to securely fasten bars 26 to their corresponding mounts 70. A plurality of other mounts 70 may be secured to the drum in an end to end fashion to form the spiral configuration. FIG. 4 shows two curved threshing members 26 being mounted on a single mount 70. It will be understood, however, that there is no special requirement as to the number of mounts 70 used with respect to any specified number of bars 26. For example, the lengths of the mounts 70 could be altered to require more or less curved bars 26. Conversely, the lengths of the curved bars 26 can be shortened or lengthened resulting in more or less corresponding mounts 70.

Although the exact longitudinal placement of the straight bars 24 can be altered, it is generally desirable to prevent a straight bar 24 from making contact with an adjacent curved bar 26. Similarly, the straight bars 24 should be circumferentially spaced so the that there is at least some distance H therebetween.

From the foregoing, the advantages of the invention are apparent. The placement of threshing members along substantially the length of the rotor enables a threshing action to take place over a longer distance resulting in better separation. The combination of the helical groups and straight threshing members cause a very controlled and metered movement of crop material along the rotor which prevents damage to the desirable crop material and prevent jamming between the cage and rotor. Because the crop material is fed along the rotor in a uniform and controlled manner, increased harvesting speed can be accomplished with less power requirements from the drive train. Additionally, there is great flexibility in use of the invention with many different types of crops. The number and arrangement of each of the threshing elements can be easily altered to accommodate specific desirable threshing actions.

This invention has been described in detail with reference to a particular embodiment thereof, but it will be understood that various other modifications can be effected within the spirit and scope of this invention.

What is claimed is:

1. A rotor assembly for use in an agricultural combine, said rotor assembly comprising:
   a cylindrical drum having a longitudinal axis defining a length and a circumference defining an outer peripheral surface;
   a plurality of at least three helical threshing groups attached to said outer peripheral surface and spaced from one another circumferentially around said drum, said at least three of said plurality of helical threshing groups extending said length of said drum continuously and unbroken, said at least three helical threshing groups extending substantially parallel with one another along a spiral pattern substantially said length of said drum; and
   a plurality of straight threshing members interspersed between each of said helical threshing groups, said plurality of straight threshing members extending substantially parallel with said longitudinal axis.

2. A rotor assembly, as claimed in claim 1, wherein:
   said plurality of helical groups traverse approximately three-quarters of said circumference of said drum.

3. A rotor assembly, as claimed in claim 1, wherein:
   said plurality of helical threshing groups include at least four helical groups extending substantially said length of said rotor.

4. A rotor assembly, as claimed in claim 1, wherein:
   said plurality of straight threshing members are arranged in a plurality of longitudinally extending rows.

5. A rotor assembly, as claimed in claim 4, wherein:
   there are a total at least 6 rows.

6. A rotor assembly, as claimed in claim 5, wherein:
   said total of at least 6 rows is 8 rows.

7. A rotor assembly, as claimed in claim 4, wherein:
   said one type of said two types is staggered longitudinally with respect to said other type of said two types.

8. A rotor assembly, as claimed in claim 4, wherein:
   each straight threshing member in a row of threshing members is placed between adjacent helical threshing groups.

9. A rotor assembly for use in an agricultural combine, said rotor assembly comprising:
   a cylindrical drum having a longitudinal axis defining a length, and a circumference defining an outer peripheral surface;
   a plurality of helical threshing groups attached to said outer peripheral surface and spaced from one another circumferentially around said drum, said plurality of helical threshing groups extending substantially said length of said drum and continuously therebetween, said plurality of helical threshing groups extending substantially parallel with one another along a spiral pattern substantially said length of said drum; and a plurality of straight threshing members interspersed between said helical threshing groups and extending substantially parallel with said longitudinal axis, said plurality of straight threshing members arranged in a plurality of longitudinally extending rows, said rows including at least two types of rows, one type of said two types of rows having at least two straight threshing members, and the other type of said two types of rows having at least three straight threshing members, said one type of said two types of rows being staggered longitudinally with respect to said other type of said two types of rows and wherein at least one straight threshing member in a row of threshing members is placed between adjacent helical threshing groups.

10. A method of threshing a crop material comprising the steps of:

providing a rotating drum axially aligned with an inflow of crop material therealong, the drum having an outer peripheral surface, a longitudinal axis defining the axial alignment and further having an infeed side and a discharge side;

positioning a plurality of at least three continuous and unbroken helical threshing groups on the outer peripheral surface and extending the length of the drum;

positioning a plurality of straight threshing members on the outer peripheral surface and interspersed between each of the at least three helical threshing groups;

introducing the crop material to the infeed side of the drum;

transporting the crop material in a substantially helical pattern along the length of the drum;

threshing the crop material with the at least three helical threshing groups and the straight threshing members substantially the length of the drum;

capturing a desired portion of the crop material along the length of the drum; and discharging an undesired portion of the crop material on the discharge side of the drum.

11. A method, as claimed in claim 10, wherein:

said at least three helical threshing groups traverse approximately three-quarters of a circumference of the drum as the helical threshing groups extend along substantially the length of the drum.

12. A method, as claimed in claim 10 wherein:

said straight threshing members are arranged in a plurality of longitudinally extending rows.

13. A method, as claimed in claim 10, wherein:

said straight threshing members are arranged in at least two types of longitudinally extending rows, one row of said at least two types of rows having at least two threshing members, and another row of said at least two types of rows having at least three threshing members.

14. A rotor assembly for use in an agricultural combine, said rotor assembly comprising:

a cylindrical drum having a longitudinal axis defining a length and a circumference defining an outer peripheral surface;

a plurality of helical threshing groups attached to said outer peripheral surface and spaced from one another circumferentially around said drum, at least two of said plurality of helical threshing groups extending substantially said length of said drum and continuously therebetween, said at least two helical threshing groups extending substantially parallel with one another along a spiral pattern substantially said length of said drum; and a plurality of straight threshing members interspersed between said helical threshing groups, said plurality of straight threshing members extending substantially parallel with said longitudinal axis;

said plurality of straight threshing members being arranged in a plurality of longitudinally extending rows; and said plurality of longitudinally extending rows including at least two types of rows, one type of said two types of rows having at least two straight threshing members, and the other type of said two types of rows having at least three straight threshing members.

15. A rotor assembly, as claimed in claim 14, wherein:

said one type of said two types is staggered longitudinally with respect to said other type of said two types.

16. A rotor assembly, as claimed in claim 14, wherein:

said two types of rows are alternately spaced around said peripheral surface of said cylindrical drum.

* * * * *